July 24, 1956     T. J. GRYPMA     2,756,092
BATTERY LIFTER
Filed Feb. 21, 1955     3 Sheets-Sheet 1
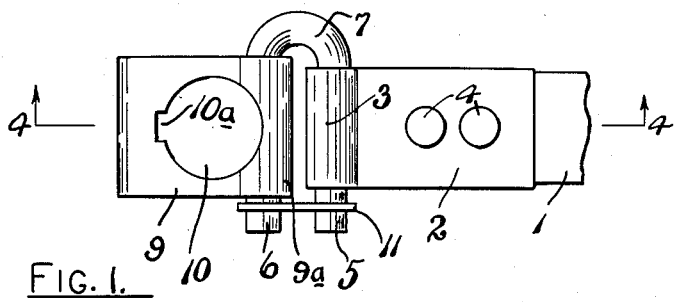
FIG. 1.
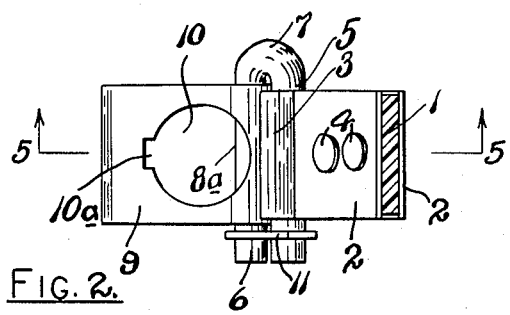
FIG. 2.
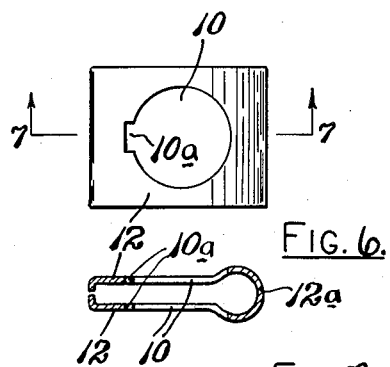
FIG. 6.
FIG. 7.
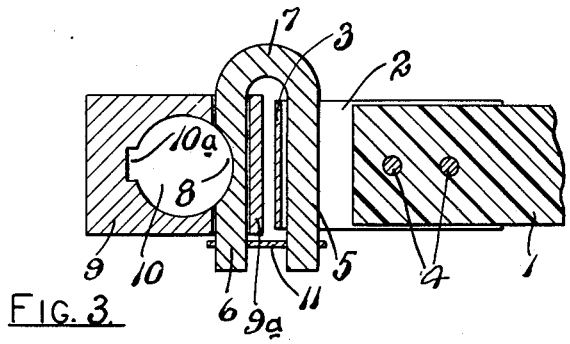
FIG. 3.
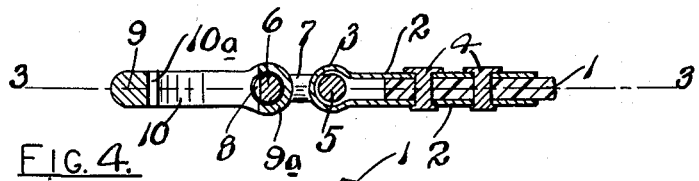
FIG. 4.
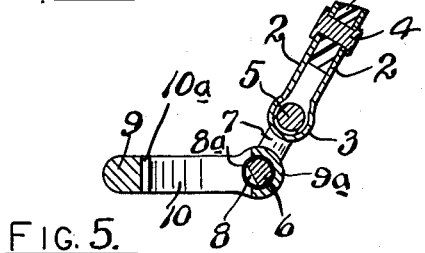
FIG. 5.
INVENTOR
THEODORE J. GRYPMA
BY
Frank E. Liverance, Jr.
ATTORNEY

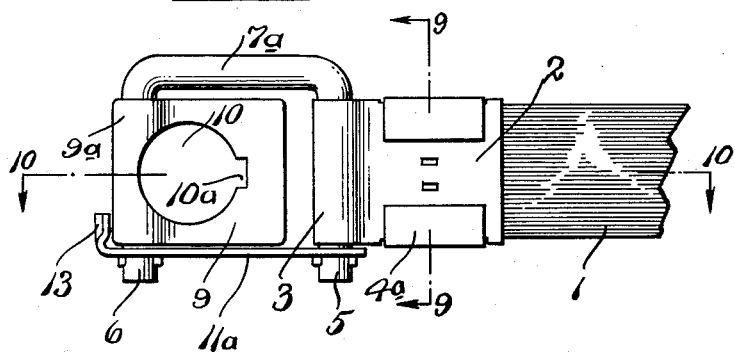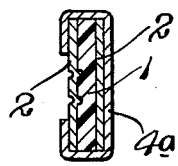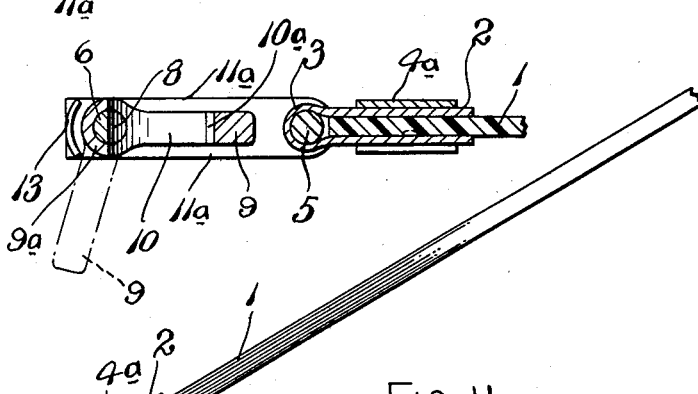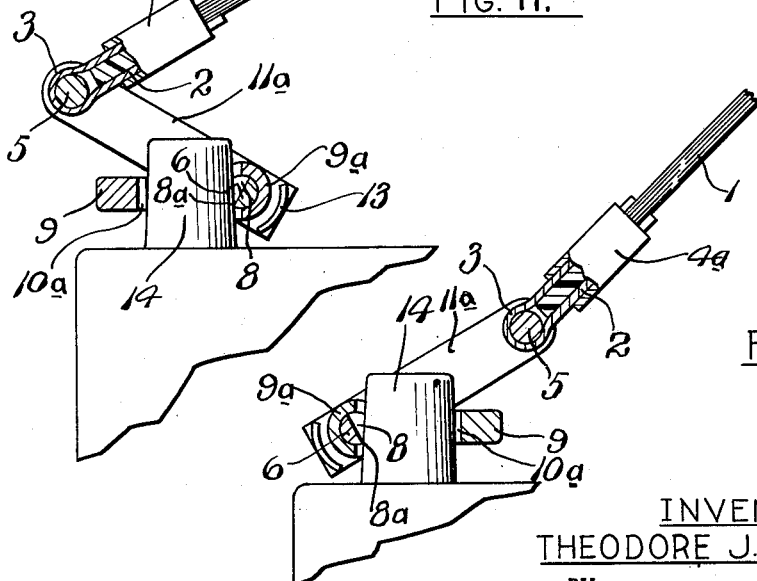

July 24, 1956  T. J. GRYPMA  2,756,092
BATTERY LIFTER

Filed Feb. 21, 1955  3 Sheets-Sheet 3

INVENTOR.
Theodore J. Grypma
-BY-
Frank E. Liverance, Jr.
Attorney

United States Patent Office
2,756,092
Patented July 24, 1956

2,756,092

BATTERY LIFTER

Theodore J. Grypma, Grand Rapids, Mich.

Application February 21, 1955, Serial No. 489,521

7 Claims. (Cl. 294—92)

The present invention relates to a novel, very practical and useful, and particularly durable and effective battery lifter used in the carrying and other handling of electric batteries, particularly of the type used in motor vehicles.

Such batteries have spaced apart upwardly extending posts one adjacent each end of the battery. Battery straps with connectors to engage the posts, one at each end of a strap, are used for lifting the batteries and carrying them from one place to another. Such connectors should be of a positive form, so that release thereof will not accidentally or otherwise occur while the battery is being lifted or carried but which, when a battery has reached its destination or place of support may have such connectors quickly and easily released.

My invention has for its object and purpose the provision of a simple, novel, automatic battery strap connector which is economical to produce, and which attains all of the above stated advantages and results in an exceptionally effective manner.

An understanding of the invention may be had from the following description, taken in connection with the accompanying drawings, in which, Fig. 1 is a plan view of the battery post connector, one being attached at each end of a battery strap.

Fig. 2 is a like view showing the strap in the position which it occupies when it is grasped, with the battery connector at each end applied to the posts of the battery, and is lifted to carry the battery.

Fig. 3 is a longitudinal horizontal section, substantially on the plane of line 3—3 of Fig. 4.

Fig. 4 is a longitudinal vertical section, substantially on the plane of line 4—4 of Fig. 1.

Fig. 5 is a like longitudinal vertical section on the plane of line 5—5 of Fig. 2.

Fig. 6 is a plan view of a modified form of battery post engaging member.

Fig. 7 is a longitudinal vertical section on the plane of line 7—7 of Fig. 6.

Fig. 8 is a view similar to Fig. 1 illustrating a modified form of construction.

Fig. 9 is a transverse section therethrough on the plane of line 9—9 of Fig. 8.

Fig. 10 is a longitudinal section on the plane of line 10—10 of Fig. 8.

Figs. 11 and 12 are partial longitudinal sections and side elevations showing the attachment of the battery lifter to a battery in two different positions thereof.

Like reference characters refer to like parts in the different figures of the drawings.

Figure 16:
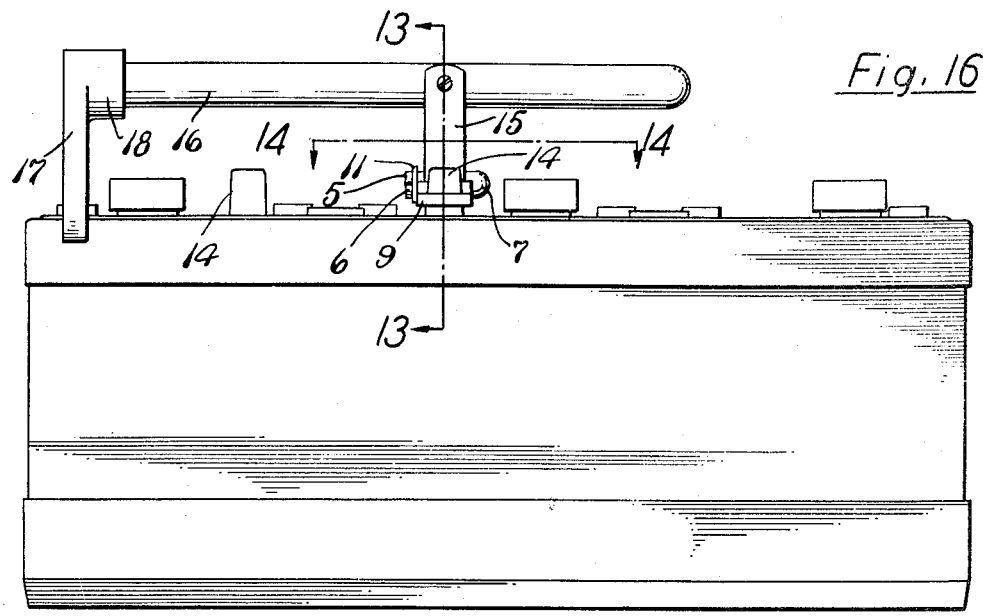
Fig. 16 is a side elevation of the structure shown in Fig. 15.

The battery strap 1, which is of any appropriate length and of suitable flexible strap material, in Figs. 1 to 5 inclusive, has attached at each end thereof a folded sheet metal member, having spaced apart sides 2 which are integrally connected by a loop 3, the interior diameter of which is greater than the distance between the adjacent sides of the spaced sides 2. At end of the battery strap is inserted between the parts or sides 2 and is permanently secured, as by rivets 4.

Through the loop 3 a rod 5 is passed, having a rotative or rocking movement therein, parallel with which is another rod 6 permanently connected with the rod 5 preferably by an integral U-shaped bend 7, as shown. The rod 6 at the side thereof farthest away from the rod 5 has a concave recess 8 which is located transversely of the rod 6 between its ends.

An immediate battery post member 9 has a vertical opening of circular outline 10 therethrough. The member 9 of suitable metal is enlarged, as at 9a, at one end into a form of generally circular cross section having a longitudinal opening therethrough, through which the rod 6 passes. The opening 10 is located with reference to the member 9 and its enlargement 9a so that it is partly in both. Member 9, diametrically opposite the recess 8 in rod 6 has a recess 10a preferably of the form shown, providing two spaced corners which are adapted to bite into a battery post inserted through the opening 10.

The concave recess 8 in the rod 6, when the member 9 is assembled with such rod 6, has the same center of curvature as the opening 10, and also is cut on the same radius so that when the battery strap 1 and a post engaging member 9 are on the same horizontal plane, as in Figs. 1, 3 and 4, the recess 8 and the adjacent portions of the opening 10 are substantially vertically flush with each other, as in Fig. 4. The opening 10 is adapted to receive the upwardly extending battery post of an electric battery, the member 9 freely passing downwardly with the post extending upwardly through said opening 10 when the parts are in the position shown in Figs. 1, 3 and 4. Upon grasping the battery strap, it being understood that the strap has one of the engaging members 9 at each end thereof, and lifting it upwardly between its ends so as to tilt the strap 1 to the position like that shown in Fig. 5, the rods 6 are turned about their axes and the corners at 8a at the upper edges of the recesses 8 are swung to and against the battery posts, grippingly engaging thereagainst automatically as the strap is lifted, and the weight of the battery applied thereto. At the same time the corners at the ends of recesses 10a bite into the post to add insurance to the secure connection of members 9 to the battery posts.

In Figs. 6 and 7, the post engaging member 9, instead of being made of solid metal, cast or otherwise produced, is shown as of sheet metal having two parallel spaced upper and lower sides 12 and a generally cylindrical connecting loop 12a through which the rod 6 may pass, the openings 10 in the upper and lower sides 12 receiving an upwardly extending battery post.

The free end portions of the rods 5 and 6 are connected together in the structure shown by a cross plate 11 which is permanently secured in place to serve as a means preventing the withdrawal or displacement of the U-shaped member consisting of the two parallel legs 5 and 6 and their connection 7. By upsetting and enlarging the outer ends of the legs 5 and 6, by cotter pins or in any other equivalent manner, such unwanted disconnection may be obtained.

When a battery is to be lifted and carried, with the post engaging member 9 and an adjacent portion of the strap 7 lying in the same horizontal plane, the post engaging member is placed over the battery post. This is done at both ends of the battery strap. Then by lifting upwardly on the middle portion of the battery strap, a secure and positive engagement of the rods 6 with the posts is obtained, and the diametrically opposed sides of the posts are pressed against the adjacent vertical sides of the openings 10 and at the sharp corners at the ends of recesses 10a. Grasping the battery strap and lifting the battery automatically makes a positive and secure connection and one which will not accidentally loosen and disengage irrespective of the condition of the post. This is valuable particularly in connection with old batteries, the posts of which may have become scored and indented or otherwise upset. If the battery posts in a long used battery have thus changed from their new condition, it is automatically taken care of as the turning of the rod 6 to cause it to grippingly and bitingly engage the post will occur, it being merely turned a little farther than when battery posts are new. Such battery strap is particularly useful with elongated batteries used with some motor vehicles in which the battery posts, one adjacent each end of the battery are positioned, such that when the strap lifts the battery there is a tendency for the battery to tilt laterally because the center of gravity of the battery is not directly under the middle portion of the strap 1. Of course the strap is equally effective, engaging securely and positively the battery posts which extend upwardly from shorter batteries, and which are more in alignment with the longitudinal center of the battery.

In Figs. 8 to 12 inclusive the previously described, short coupled U-shaped member consisting of the rods 5 and 6 connected by the U-bend 7 is replaced by a U-shaped member which has farther separated parallel rods 5 and 6 connected at one end by an elongated section 7a of a sufficient length that the battery post member 9 may be located between the rods 5 and 6. Similarly the connecting plate 11 is elongated as at 11a to correspond with the increase of the distance between rods 4 and 6. The outer end of the member 11a is turned at right angles and shaped to form stops 13 which limit turning the member 9 to substantially 180 degrees of movement.

The connection of the strap 1 with the end sections 2 of the loop 3 is by a surrounding clip 4a which forms no part of the present invention.

As shown in Fig. 12, the post engaging member 9 engages with the post 14 of the battery, the corner at 8a of recess 8 biting into the post, while at each end of the recess 10a there is also a biting into the post so that a secure connection is made. The member 11a and section 7a are in general alignment with the strap 1. In Fig. 11 the post engaging member 9 is differently located with respect to the rod 5, section 7a and plate 11a, the opposite corner 8a engaging with the post 14 as shown.

Figure 15:
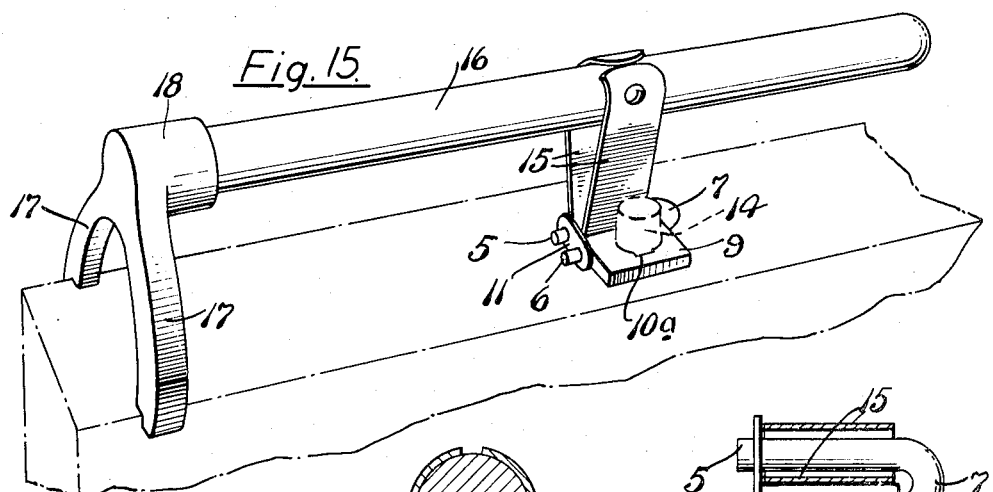
Fig. 15 is a perspective view showing the battery post connector of my invention connected to a different lifter structure for application to a battery and battery post.
Figure 13:
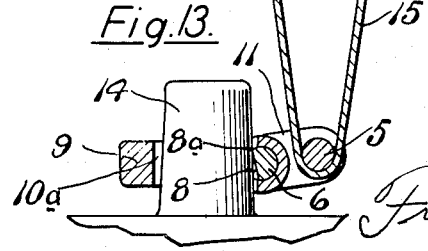
Fig. 13 is a vertical section substantially on the plane of line 13—13 of Fig. 16.
Figure 14:
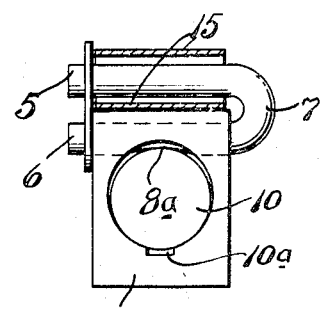
Fig. 14 is a horizontal section and plan on the plane of line 14—14 of Fig. 16.

The same post engaging member and mounting therefor may also be used with a different type of battery carrier such as shown in Figs. 13 to 16 inclusive. The post engaging member 9 and the U-member on which it is mounted, consisting of the rods 5 and 6 and short couple bend 7, are used with a flat metal stirrup member 15 of generally U-shape having a pivotal connection with the rod 5 which is seated in the bend of the member 15. The legs of member 15 extend upwardly and are permanently secured to a relatively long handle rod 16 of wood or similar material. The attachment of the stirrup 15 to the rod 16 is between the ends of such rod. One end of the rod is equipped with a battery engaging member having diverging legs 17 connected at their upper ends to a socket 18 in which the rod 16 is inserted and with which it is permanently connected. The rod 16, when connection is made with battery post of the battery of the type shown in Fig. 16, lies longitudinally over the central line of the body, the stirrup 15 extending downwardly and post member 19 laterally to one side to engage with the post 14. The engagement is the same as in the other described structures, namely, by lifting upon the rod 5 rod 6 is turned and at its recess 8 comes against the post, the corner at 8a biting into the post. The legs 17 of the described battery engaging member, at their lower ends, press upon the battery top at opposite sides thereof (Fig. 15), and by lifting upon the rod 16 at its free end portion the battery may be readily carried.

This battery carrier is particularly useful with a type of battery which is of an elongated form and has its posts to one side of the vertical central plane of the battery. The center of gravity of the battery is substantially directly below where the hand of the one carrying the battery grasps the rod 16.

All forms of constructions shown and described are readily and easily manufactured at low cost, and are particularly useful and effective in assuring that, irrespective of the condition of the battery and particularly the posts which extend upwardly therefrom, there will be maintained at all times a sure and certain connection. The release is by merely setting the battery down upon a support and releasing the battery from the upward pull thereon, whereupon the rod 6 automatically turns back to releasing position in which the recess 8 in the rod 6 is vertically aligned with the opening 10 through the post engaging member 9, thus automatically disconnecting from the post.

The invention is described in the appended claims and is to be considered comprehensive of all forms of structure coming within their scope.

I claim:

1. In structure of the class described, two parallel, spaced rods rigidly connected together, a strap secured to one of said rods, extending thereupon in a direction perpendicular to the length of said rod, and a member rockingly mounted at one end upon the other rod to turn about the longitudinal axis thereof, said member having a generally circular opening therethrough across one side of which opening said other rod, at one side thereof, passes, said other rod, having a generally concave recess in said side thereof between its ends, which, when said member and strap are in the same plane, has its sides in alignment with adjacent walls of said opening.

2. In structure of the class dscribed, two parallel spaced rods rigidly connected together, a strap secured at an end thereof for rocking movement about the longitudinal axis of one of the rods, a flat member having a transverse, generally circular opening therethrough rockingly mounted at one end of the second rod, said second rod extending across and at the inner side of said opening, said second rod having a recess between its ends and at a side thereof which, when said member and strap are in the same plane, is in aligned conjunction with the opening through said member.

3. In a structure of the class described, a rod, a flat member, through an end portion of which said rod freely passes, said member having a circular opening therethrough from one side to the other, across one side of which opening the rod extends, said rod having a recess between its ends at a side of arcuate form having the same radius and center of curvature as said opening, a strap, and means connecting an end of the strap to said rod, for turning the rod about its longitudinal axis on moving the strap from a plane coincident with the plane of said member to a plane at an angle thereto.

4. In structure of the class described, a U-shaped member having two spaced parallel rods integrally connected at one end, a battery strap connected to one of said rods extending therefrom at right angles to the lentgh thereof, a battery post flat member having a post passing opening therethrough, through which the other rod freely passes at one end of the member and across a side of said opening therein, said other rod having a recess in a side thereof between its ends permitting free passage of a battery post into said opening when the adjacent end portion of the battery strap and the post engaging member are substantially in the same plane.

5. Structure as described comprising, a U-shaped member having two spaced parallel rods integrally connected at one of the ends of said rods, a battery post engaging flat member having a generally circular post passing opening therethrough, one of said rods extending through and mounted on said flat member for relative rotary movements of said rod and flat member about the longitudinal axis of said rod, said rod at a side thereof extending across a side of said opening and having an arc shape recess therein between its ends providing, in one position of the rod, an arc shaped portion of the opening to freely pass a battery post of circular cross section, and means rotatively connected to the other rod, adapted to be pulled in a direction at an angle to the plane of said post engaging member to turn the first rod about its longitudinal axis.

6. Structure having the elements in combination defined in claim 5, said means rotatively connected to the other rod comprising a U-shaped member of flat metal having legs connected by an integral bend, within which bend said other rod is located, and a manually operable member to which said legs are secured.

7. Structure having the elements in combination defined in claim 5, said means rotatively connected to the other rod comprising, a member of flat thin metal of U-shape having spaced legs connected at one end by an integral bend, within which bend said other rod is located, the legs extending upwardly, an elongated rod between the ends of which said legs are permanently secured at their upper ends, with said post engaging flat member below and to one side of said last mentioned rod, and a member secured to and extending downwardly from one end of the last mentioned rod adapted to press against the upper side of a battery, a post of which is engaged by said post engaging member.

No references cited.